United States Patent [19]

Okamoto

[11] Patent Number: 5,497,344
[45] Date of Patent: Mar. 5, 1996

[54] DATA FLOW TYPE INFORMATION PROCESSOR

[75] Inventor: Toshiya Okamoto, Kyoto, Japan

[73] Assignee: Sharp Kabushiki Kaisha, Osaka, Japan

[21] Appl. No.: 275,669

[22] Filed: Jul. 15, 1994

Related U.S. Application Data

[63] Continuation of Ser. No. 490,411, Mar. 8, 1990, abandoned, Continuation-in-part of Ser. No. 301,586, Jan. 26, 19895, 125,097.

[30] Foreign Application Priority Data

Mar. 14, 1989 [JP] Japan ..................... 1-62841

[51] Int. Cl.$^6$ .............. G06F 9/00; G06F 15/82
[52] U.S. Cl. .............. 395/800; 364/232.22; 364/261.3; 364/259; 364/262.8; 364/DIG. 1
[58] Field of Search ................... 395/375, 800

[56] References Cited

U.S. PATENT DOCUMENTS

| | | | |
|---|---|---|---|
| 4,953,082 | 8/1990 | Nomura et al. | 395/650 |
| 5,021,947 | 6/1991 | Campbell et al. | 395/375 |
| 5,029,080 | 7/1991 | Otsuki | 395/375 |
| 5,043,880 | 8/1991 | Yoshida | 395/375 |
| 5,093,919 | 3/1992 | Yoshida et al. | 395/800 |
| 5,115,510 | 5/1992 | Okamoto et al. | 395/775 |
| 5,117,499 | 5/1992 | Miyata | 395/800 |
| 5,125,097 | 6/1992 | Okamoto et al. | 395/800 |

*Primary Examiner*—Vincent N. Trans
*Assistant Examiner*—Ayni Mohamed

[57] ABSTRACT

A data packet including a destination field, an instruction field and two data fields is outputted from a data pair detecting portion of a data flow type information processor. The data packet is divided into two data packets. The data packet including the destination field and an identification tag is sent to a program storing portion, and the data packet including the instruction field, the two data fields and the identification tag is sent to an operation processing portion. The program storing portion outputs a data packet including the destination field, the instruction field and the identification tag. The operation processing portion outputs a data packet including a result data field and the identification tag. These data packets are merged with each other, based on the identification tags and sent to the data pair detecting portion.

7 Claims, 3 Drawing Sheets

DATA FLOW TYPE INFORMATION PROCESSOR

This application is a continuation of application Ser. No. 07/490,411 filed on Mar. 8, 1990, now abandoned and a continuation-in-part of application Ser. No. 301,586 filed on Jan. 26, 1989 which issued as U.S. Pat. No. 5,125,097 on Jan. 23, 1992.

BACKGROUND OF THE INVENTION

1. Field of the Invention

The present invention relates generally to data flow type information processors, and more particularly, data flow type information processors for executing data flow program including instructions for performing a numerical value operation processing or a logical operation processing with respect to two sets of data and a processing method thereof.

2. Description of the Background Art

In a conventional von Neuman type computer, various instructions are stored in advance as a program in program memories, and addresses in the program memories are sequentially designated by a program counter so that the instructions are sequentially read out to be executed.

On the other hand, a data flow type information processor is one type of non-yon Neuman type computer having no concept of sequential execution of instructions by a program counter. Such a data flow type information processor employs architecture based on a parallel processing of instructions. In the data flow type information processor, immediately after data which are objects of an operation are collected, it becomes possible to execute an instruction and a plurality of instructions are simultaneously driven by the data, so that program is executed in parallel in accordance with the natural flow of the data. As a result, it is considered that the time required for the operation is significantly reduced.

FIG. 1 is a block diagram showing one example of a structure of a conventional data flow type information processor. FIG. 2 is a diagram showing one example of a field structure of a data packet to be processed by the information processor.

A data packet 60 shown in FIG. 2 includes a destination field 41, an instruction field 42, a data 1 field 43, and a data 2 field 44. The destination field stores destination information, the instruction field 42 stores instruction information, and the data 1 field 43 or the data 2 field 44 stores operand data.

The information processor shown in FIG. 1 includes a program storing portion 1, a data pair detecting portion 2 and an operation processing portion 3. The program storing portion 1 stores data flow program 70 shown in FIG. 3. The program storing portion 1 reads, as shown in FIG. 3, destination information 71, instruction information 72 and copy presence/absence information 73 of the data flow program 70 by addressing based on destination information of an inputted data packet 60, stores the destination information 71 and the instruction information 72 in the destination field 41 and the instruction field 42 of the data packet 60, respectively, and outputs the data packet 60. The data pair detecting portion 2 queues the data packets 60 outputted from the program storing portion 1. More specifically, the data pair detecting portion 2 detects two different data packets having the same destination information, stores operand data of one of the data packets 60, for example, the contents of the data 1 field 43 shown in FIG. 2, in the data 2 field 44 of the other data packet 60, and outputs the other data packet 60. The operation processing portion 3 performs an operation processing with respect to the data packet 60 outputted from the data pair detecting portion 2, in accordance with the instruction information, stores the result of the operation processing in the data 1 field 43 of the data packet, and outputs the data packet 60 to the program storing portion 1.

The program storing portion 1 and the data pair detecting portion 2 are coupled to each other by data transmission path 4. The data transmission path 4 is branched into two and coupled to two input ports of the data pair detecting portion 2. The data packet 60 outputted from the program storing portion 1 is selectively inputted to either of the input ports of the data pair detecting portion 2, in response to the operand data being right operand data or left operand data in the operation processing. In addition, the data pair detecting portion 2 and the operation processing portion 3 are coupled to each other by a data transmission path 5 and the operation processing portion 3 and the program storing portion 1 are coupled to each other by a data transmission path 6.

As the data packets 60 continue to circulate through the program storing portion 1, the data pair detecting portion 2, the operation processing portion 3 and the program storing portion 1, the operation processing in accordance with the data flow program 70 stored in the program storing portion 1 proceeds.

Now consider a case where data needs to be copied in the data flow program 70 to be executed, as shown in FIG. 4. For example, when an output of an instruction of addition in FIG. 4 is referred by more than two other operations, instructions of multiplication and subtraction in FIG. 4, a copy processing is performed in the program storing portion 1. As shown in FIG. 3, the program storing portion 1 stores the copy presence/absence information 73.

The contents of portion of the data flow program 70 addressed based on the destination information of the inputted data packet 60 is read out. On this occasion, if the copy presence/absence information 73 indicates "absence", the data packet 60 with its contents of the destination fields 41 and the updated instruction field 42 updated is outputted, whereby the processing thereof is completed. On the other hand, if the copy presence/absence information 73 indicates "presence", the data packet 60 with its contents of the destination field 41 and the updated instruction field 42 is outputted and the stored subsequently destination information 71, instruction information 72 and copy presence/absence information 73 are read out. If the subsequently read out copy presence/absence information 73 indicates "absence", the data packet 60 is outputted which stores the same data as that of the inputted data packet 60 in the data 1 field 43 thereof and stores the just read out destination information 71 and instruction information 72 in the destination field 41 and the instruction field 42 thereof, respectively, whereby the processing is completed. If the subsequently read out copy presence/absence information 73 indicates "presence", the same copy processing will again be repeated.

In the above described information processor, once the copy processing is performed, a flow ratio of the data packets on the transmission path 6 for the input of the program storing portion 1 to the data packets on the transmission path 4 for the output from the program storing portion 1 becomes 1:2 without fail. The flow ratio of the data packets here is a ratio of the number of the data packets passing through these transmission paths per hour. FIG. 5 shows a flow rate of data packets on each transmission path, assuming that the flow rate of the data packets on the transmission path 4 is 1. The data pair detecting portion 2 outputs one data packet 60, in response to two data packets 60 being inputted. Therefore, even if it is assumed that the transmission path 4 operates at its highest capacity, only half of its highest capacity can be obtained through transmission path 5.

As the foregoing, in the copy processing at the program storing portion 1, the transmission paths 5 and 6 operate at only half the highest capacity thereof. Therefore, the operation processing portion 3 also operates at half its potential, thereby causing the reduction in the performance of the above described information processor during the execution of the program.

FIG. 6 is a block diagram showing another example of a structure of the conventional data flow type information processor.

The information processor of FIG. 6 is provided with two program storing portions 11 and 12. Each of the data packets 60 outputted from the operation processing portion 3 is inputted to either the program storing portions 11 or 12 through an allotting portion 13. The operation processing portion 3 and the allotting portion 13 are coupled to each other by a data transmission path 6. The allotting portion 13 is coupled to the program storing portions 11 and 12 through data transmission paths 16 and 17, respectively. Furthermore, the program storing portions 11 and 12 are individually coupled to the data pair detecting portion 2 through data transmission paths 14 and 15, respectively. Functions of the respective portions of the the information processor shown in FIG. 6 are completely the same as those of the respective portions of the information processor shown in FIG. 1. The allotting portion 13 allots the data packets 60 outputted from the operation processing portion 3 to either the program storing portions 11 or 12, in the order of their arrivals.

FIG. 7 shows a flow rate of data packets 60 on each transmission path on the assumption that both of the flow rates of the data packets on the transmission paths 14 and 15 are 1. In the information processor of FIG. 6, since the inputs from the data packets 60 to the program storing portions 11 and 12 are allotted by the allotting portion 13, the data packets 60 are inputted to the program storing portions 11 and 12 at a rate half of the highest capacity. When a copy process is performed at the program storing portions 11 and 12, the flow rate of the data packets outputted from the program storing portions 11 and 12 onto the transmission paths 14 and 15 doubles the flow rate of the data packets 60 inputted to the program storing portions 11 and 12 through the transmission paths 16 and 17. Namely, a flow rate at its highest capacity can be obtained on each of the transmission paths 14 and 15 for inputting the data packets 60 to the data pair detecting portion 2. In addition, a flow rate at its highest capacity can be obtained also on the transmission path 5 for the data packets 60 outputted from the data pair detecting portion 2, that is, the transmission path 5 for the data packets 60 inputted in the operation processing portion 3.

Accordingly, in the conventional information processor of FIG. 6, the performance of the operation processing portion 3 is enhanced to the maximum, so that theoretically, doubled effects of the parallel processing can be obtained as compared with the conventional information processor of FIG. 1.

The data flow type information processor shown in FIGS. 1 and 6 is disclosed in, for example, the article entitled "Examinations (1) and (2) on System Structure of Data Driven Type Processor" by Okamoto et al. from the Processings of 34th National Conference (the first half of 1987) of Information Processing Society pp. 237–240.

The conventional data flow type information processor shown in FIG. 6 comprises a doubled program storing portion for enhancing efficiency of processing by the above described data flow type information processor shown in FIG. 1.

However, since the data flow type information processor shown in FIG. 6 comprises the doubled program storing portion 1, the entire storage amount in the program storing portion 1 doubles that of the processor shown in FIG. 1. As a result, the information processor is larger.

Furthermore, since the data packets 60 which circulate among the processing portions in the processor, in the order of executions of the data flow program 70 stored in the program storing portion 1 are always processed in the pattern shown in FIG. 2, data lines (paths) of the data transmission paths connecting the respective processing portions are unnecessarily wide. More specifically, in reading the data flow program 70 from the program storing portion 1, essentially, only the data in the destination field 41 of the data packet 60 which indicates the subsequent processing instruction is required and the data in the instruction field 42, the data 1 field 43 and the data 2 field 44 of the data packet 60 is not required. In addition, also at the operation processing portion 3, the data in the instruction field 42, the data 1 field 43 and the data 2 field 44 of the data packet 60 is required and the data in the destination field 41 of the data packet 60 is not required, resulting in a physical waste of the structure of the processor.

SUMMARY OF THE INVENTION

An object of the present invention is to make a data flow type information processor smaller in scale without the reduction in its performance.

Another object of the present invention is to provide a compact data flow type information processor in which performance of each processing portion is not reduced even when a plurality of pieces of information is read from a program storing portion such as in a copy processing, and a processing method thereof.

A further object of the present invention is to provide a data flow type information processor which can be made smaller physically in scale by forming data packets circulating among processing portions with the minimum information required for each processing portion.

The data flow type information processor according to the present invention comprises a program storing portion, an operation processing portion, a data pair detecting portion, a branch portion and a merging portion. The program storing portion stores data flow program including a plurality of pairs of destination information and instruction information and reads the subsequent destination information and instruction information from the data flow program, based on the inputted destination information. The operation processing portion executes an operation with respect to inputted data, based on inputted instruction information, and outputs data indicating an operation result. The merging portion couples the destination information and the instruction information read out from the program storing means with the corresponding data outputted from the operation processing portion. The data pair detecting portion receives an output from the merging portion to output the data corresponding to the same destination information together with the destination information and the instruction information. The branch portion receives an output from the data pair detecting portion and supplies the destination information to the program storing portion, and supplies the instruction information and the data to the operation processing portion.

In the data flow type information processor, destination information required for reading the data flow program is sent to the program storing portion and instruction information and data required for an operation processing is sent to the operation processing portion. Thus, the minimum information required for each processing portion is sent to the processing portion. Therefore, it is possible to reduce widths of data transmission paths coupled between the respective processing portions and a chip area of each processing portion.

The branch portion preferably may attach the identification information indicating correspondence between the destination information to be supplied to the program storing portion and the instruction information and the data to be supplied to the operation processing portion, to the destination information and the instruction information or the data. In addition, the merging portion may couple the destination information and the instruction information read out from the program storing portion with the corresponding data outputted from the operation processing portion, based on the identification information.

In this case, even if the plurality of pairs of information are read out from the program storing portion, as in the time of the copy processing, the destination information and the instruction information can be coupled with the corresponding data at the merging portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described with reference to the drawings in the following.

Figure 8:
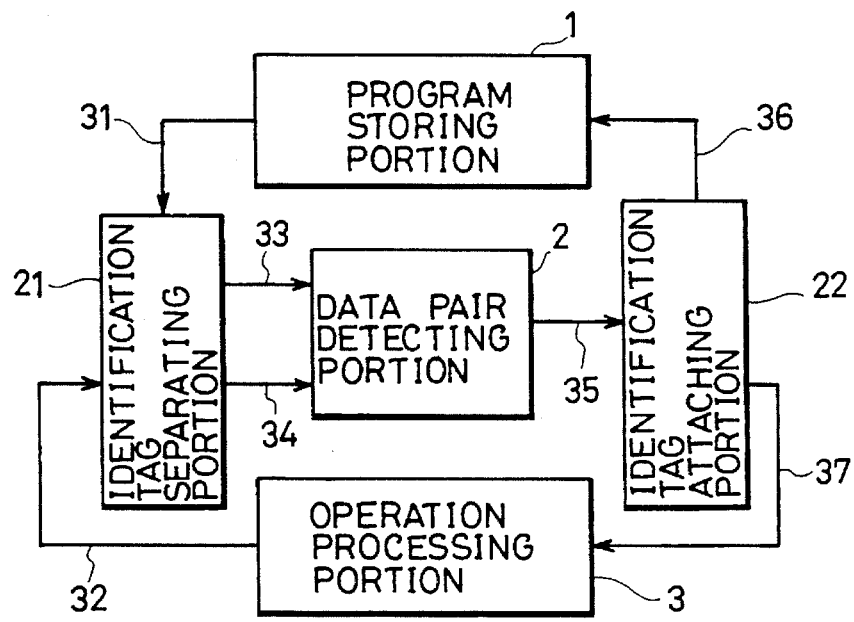
FIG. 8 is a block diagram showing a structure of a data flow type information processor according to one embodiment of the present invention.

FIG. 8 is a diagram showing a structure of a data flow type information processor according to one embodiment of the present invention.

In FIG. 8, processing at a program storing portion 1, a data pair detecting portion 2 and an operation processing portion 3 are the same as those of a conventional information processor. In this embodiment, an identification tag separating portion 21 which operates as a merging portion is located at inputs of the data pair detecting portion 2 and an identification tag attaching portion 22 which operates as a branch portion is located at an output of the data pair detecting portion 2.

In the present embodiment, an output of the program storing portion 1 and an output of the operation processing portion 3 are connected to two inputs of the identification tag separating portion 21 and two outputs of the identification tag separating portion 21 are connected to the two inputs of the data pair detecting portion 2. The output of the data pair detecting portion 2 is connected to an input of the identification tag attaching portion 22 and two outputs of the identification tag attaching portion 22 are connected to inputs of the program storing portion 1 and the operation processing portion 3, respectively.

The program storing portion 1 and the identification tag separating portion 21 are coupled to each other by a transmission path 31, and the operation processing portion 3 and the identification tag separating portion 21 are coupled to each other by a transmission path 32. In addition, the identification tag separating portion 21 and the data pair detecting portion 2 are coupled to each other by two transmission paths 33 and 34, and the data pair detecting portion 2 and the identification tag attaching portion 22 are coupled to each other by a transmission path 35. Furthermore, the identification tag attaching portion 22 and the program storing portion 1 are coupled to each other by a transmission path 36, and the identification tag attaching portion 22 and the operation processing portion 3 are coupled to each other by a transmission path 37.

Figure 9:
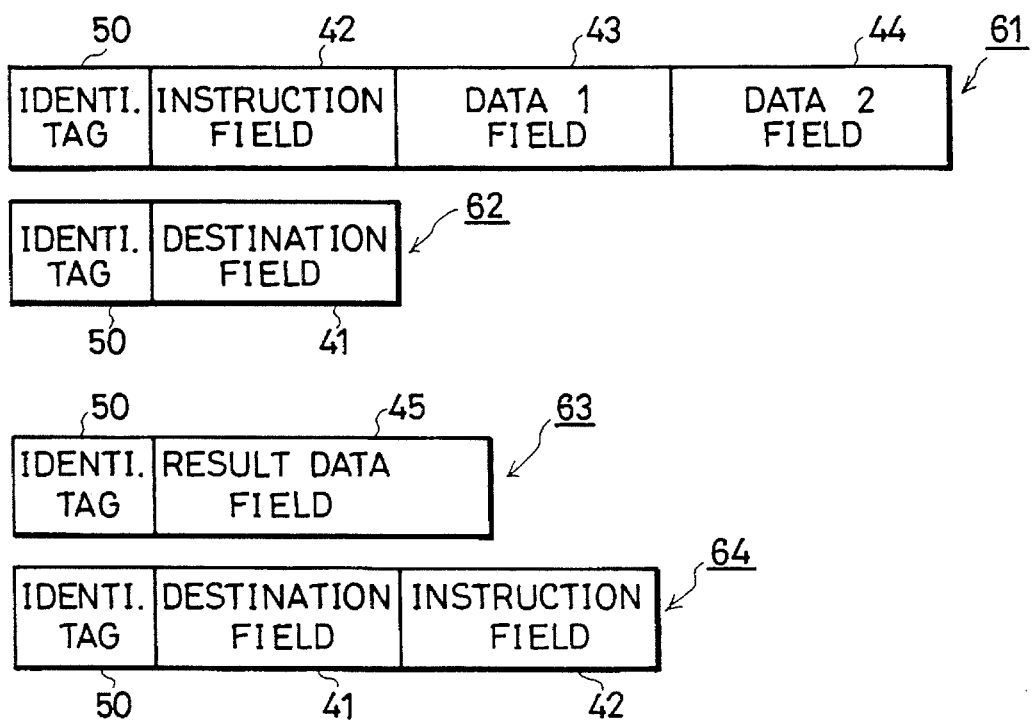
FIG. 9 is a diagram showing a field structure of a data packet to be processed in the information processor of FIG. 8.

FIG. 9 is a diagram showing a field structure of a data packet to be processed in the information processor of FIG. 8. Data packets shown in FIG. 9 are formed of the above described processing portions shown in FIG. 8. In FIG. 9, a data packet 61 is comprised of an identification tag 50, an instruction field 42, a data 1 field 43 and a data 2 field 44. The identification tag 50 is a sign (identification information) for connecting two data packets. A data packet 62 is comprised of the identification tag 50 and the destination field 41. A data packet 63 is comprised of the identification tag 50 and a result data field 45. The result data field 45 stores an operation result obtained in the operation processing portion 3. A data packet 64 is comprised of the identification tag 50, the destination field 41 and the instruction field 42. The identification tag 50 is a sign (identification information) for connecting two data packets. The rest of the fields store the same data as that of the conventional one.

Now referring to FIGS. 8, 9, 2 and 3, a processing operation of the information processor shown in FIG. 8 will be described.

First, the data packets 60 are sent from the program storing portion 1 to the identification tag separating portion 21. Each of the data packets 60 stores the data which is an object of an operation processing in the data 1 field 43 or the data 2 field 44. On this occasion, since the data packet 60 is not supplied with the identification tag 50, separating operation of the identification tag 50 is not performed at the identification tag separating portion 21, whereby the data packet 60 is sent to the data pair detecting portion 2 via the transmission path 33. The data pair detecting portion 2 queues packets each having the identical destination field 41 and immediately after the packets are collected, subjects the packets to the same processing as that of the conventional device to generate a data packet 60. The data packet 60 generated in the data pair detecting portion 2 is sent to the identification tag attaching portion 22 via the transmission path 35.

On this occasion, the data packet 60 stores an address to be specified in the destination field 41, which address is for reading a subsequent instruction from the data flow program 70 stored in the program storing portion 1. In addition, the data packet 60 stores the contents of the operation for the data in the instruction field 42 and also stores the data which will be an object of the operation in the data 1 field 43 or the data 2 field 44 (a pair of which is used for an operation requiring two data and one of which is used for an operation requiring one data).

The identification tag attaching portion 22 divides the data packet 60 into the data packet 61 and the data packet 62. The identification tags 50 supplied to both the data packet 61 and the data packet 62 show that both the packets make a pair generated from the same data packet 60. The data packet 62 generated in the identification tag attaching portion 22 is sent to the program storing portion 1 via the transmission path 36 in order to read a subsequent instruction from the data flow program 70 stored in the program storing portion 1. The data packet 61 is sent to the operation processing portion 3 via the transmission path 37 in order to perform a data operation processing.

The program storing portion 1 generates the data packet 64 based on the information in the data packet 62 sent from the identification tag attaching portion 22. More specifically, the program storing potion 1 stores the destination information 71 of the data flow program 70 in the destination field 41 of the data packet 64, which destination information is designated by the address stored in the destination field 41 of the data packet 62. In addition, the program storing portion 1 stores the instruction information 72 of the data flow program 70 in the instruction field 42 of the data packet 64. The identification tag 50 of the data packet 62 is supplied to the identification tag 50 of the data packet 64. The data packet 64 generated in the program storing portion 1 is sent to the identification tag separating portion 21 via the transmission path 31.

The operation processing portion 3 generates the data packet 63 based on the information of the data packet 61 sent from the identification tag attaching portion 22. More specifically, the operation processing portion 3 performs an operation processing by using the data stored in the data 1 field 43 and the data 2 field 44 of the data packet 61, based on the contents of the operation stored in the instruction field 42 of the data packet 61. The operation result is stored in the result data field 45 of the data packet 63. The identification tag 50 of the data packet 61 is supplied to the identification tag 50 of the data packet 63. The data packet 63 generated in the operation processing portion 3 is sent to the identification tag separating portion 21 via the transmission path 32.

The data packet 64 sent from the program storing portion 1 and the data packet 63 sent from the operation processing portion 3 merge with each other at the identification tag separating portion 21. The data packet 60 is generated from the merged data packet 63 and data packet 64 at the identification tag separating portion 21. Namely, one packet is generated by marking the identification tags 50 included in both the data packets 63 and 64. The data packet 60 generated in the identification tag separating portion 21 is sent to the data pair detecting portion 2 via the transmission paths 33 or 34. Thereafter, the processing in accordance with the data flow program 70 is executed through the respective devices.

When copy presence/absence information 73 read out based on the contents of the destination field 41 in the inputted data packet 62 (FIG. 3) indicates "presence", two data packets 64 are outputted from the program storing portion 1. One data packet 64 stores the destination information 71 and the instruction information 72 read out from the data flow program 70 by addressing and the identification tag 50 in the inputted data packet 62. The other data packet 64 stores the destination information 71 and the instruction information 72 read out from the subsequent address and the same identification tag 50. These two data packets 64 are merged with the data packet 63 outputted from the operation processing portion 3 at the identification tag separating portion 21. These two data packets 64 have the same identification tag 50, so that these packets are merged with the same data packet 63. As a result, two data packets having the same data are outputted from the identification tag separating portion 21. These data packets comprise a destination field 41, an instruction field 43 and a data 1 field 42.

Accordingly, in the present embodiment, since data packets including only the data (information) required for each processing portion are generated and transmitted, data lines through which the data packets are transmitted can be reduced to have widths required for the data packets to be transmitted.

In the above described embodiment, queuing data packets having the same identification tags 50 is executed at the identification tag separating portion 21. Accordingly, the identification tag separating portion 21 has an internal buffer or an external buffer for queueing (not shown).

As the foregoing, according to the present invention, the data packets transmitted among the respective processing portions in the information processor include only the minimum data (information) required for processings in the respective processing portions and are transmitted on the transmission paths, thereby reducing width of the data lines connecting between the processing portions and further more it is possible to reduce an area of an IC chip which is a structure unit of each processing portion.

In case the information processor has a plurality of processing portions, program storing portions, data pair detecting portions and operation processing portions, the above described advantage is effective for making the apparatus itself smaller in scale.

Figure 1:
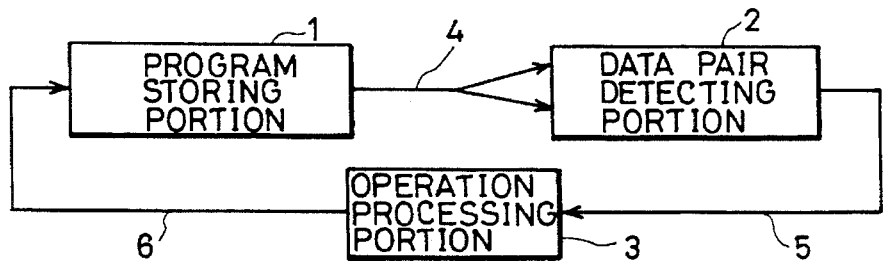
FIG. 1 is a block diagram showing one example of a structure of a conventional data flow type information processor.
Figure 2:
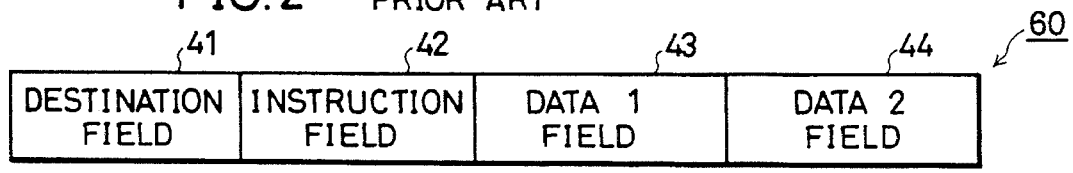
FIG. 2 is a diagram showing a field structure of a data packet to be processed in the data flow type information processor.
Figure 3:
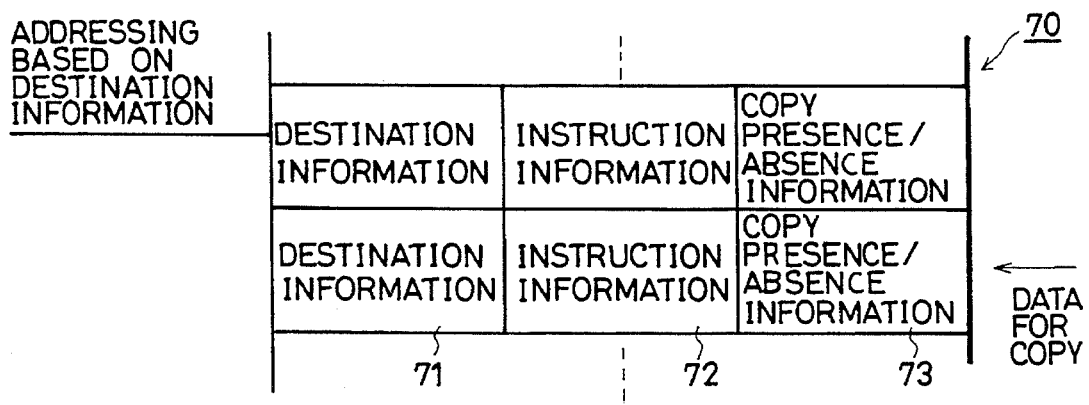
FIG. 3 is a diagram showing a part of data flow program stored in a program storing portion of the data flow type information processor.
Figure 4:
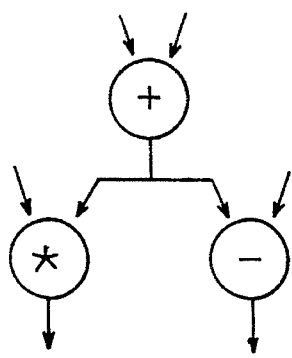
FIG. 4 is a diagram showing a part of the data flow program including a copy processing.
Figure 5:
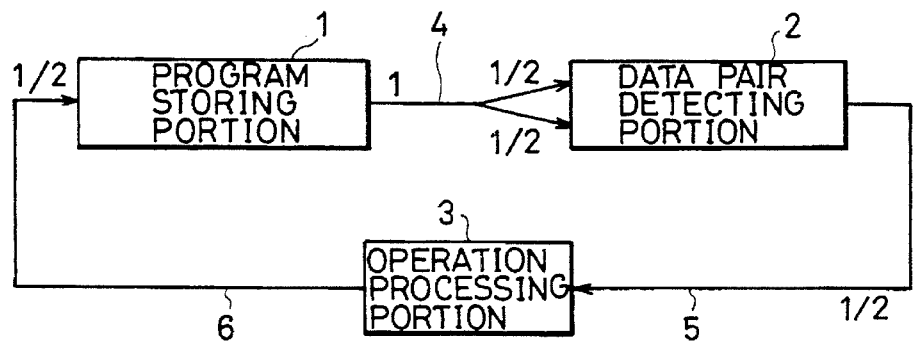
FIG. 5 is a diagram showing a flow rate of data packets on each data transmission path of the information processor shown in FIG. 1.
Figure 6:
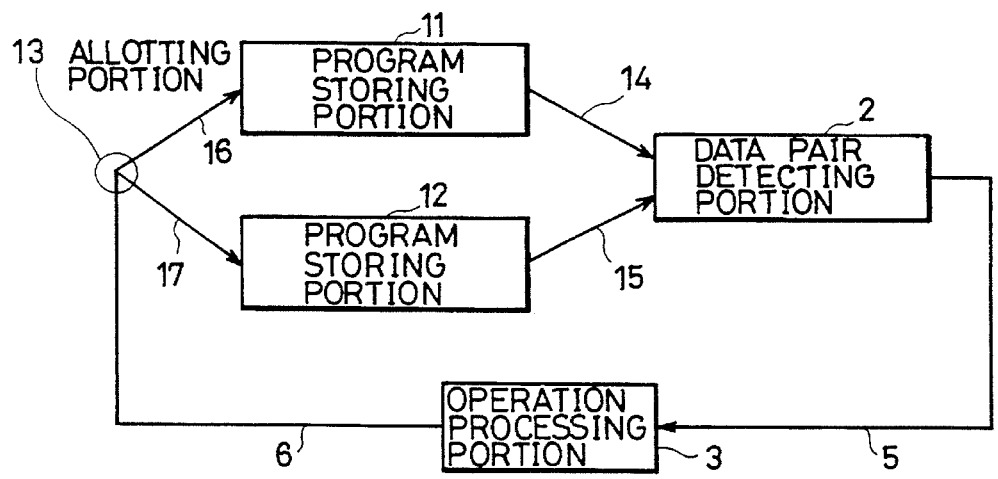
FIG. 6 is a block diagram showing another example of a structure of the conventional data flow type information processor.
Figure 7:
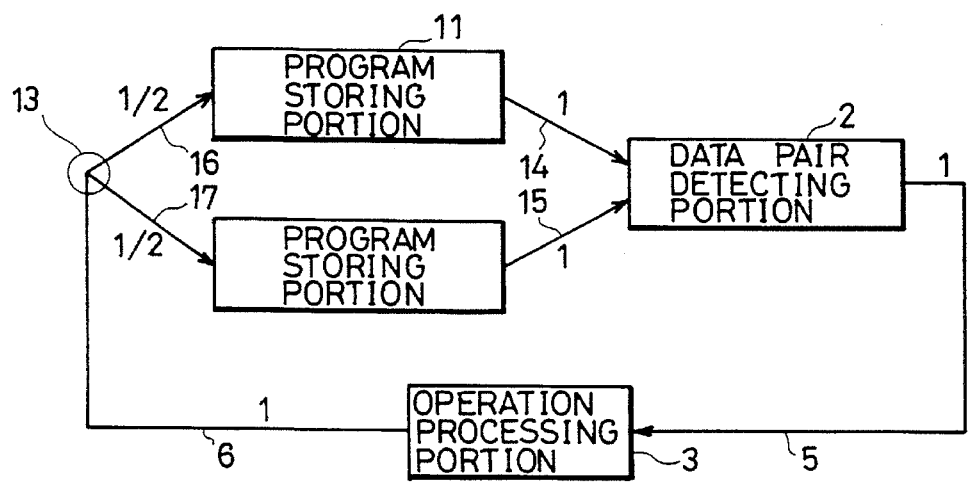
FIG. 7 is a diagram showing a flow rate of data packets on each data transmission path of the information processor of FIG. 6.

In addition, even if the information processor is structured as a multiprocessor by combining a plurality of units shown in FIG. 1 each being one unit, the above described advantage is effective for making the apparatus itself smaller in scale.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow type information processor for performing an operation processing in accordance with a data flow program including a plurality of pairs of destination information and instruction information, comprising:

program storing means for storing the data flow program and outputting the destination information and the instruction information based on first input data;

operation processing means for performing an operation process with respect to second input data and for outputting operand data indicative of an operation result;

merging means for merging the destination information and the instruction information output from said program storing means and the corresponding operand data output from said operation processing means, and outputting the destination information, the instruction information and the operand data;

data pair detecting means for receiving the destination information, the instruction information and the operand data output from said merging means, for detecting data corresponding to same destination information and for outputting the same destination information, the instruction information and the operand data; and branching means for receiving the destination information, the instruction information and the operand data from said data pair detecting means, and outputting only the destination information to said program storing means as the first input data, and outputting only the instruction information and operand data to said operation processing means as the second input data, for simultaneously executing process in said program storing means and said operation processing means.

2. The information processor according to claim 1, wherein said branching means attaches identification information, said identification information indicating a correspondence between the destination information being supplied to said program storing means and the instruction information data being supplied to said operation processing means, to the destination information, the instruction information or the operand data;

said merging means merges the destination information and the instruction information read out from said program storing means with the corresponding operand data outputted from said operation processing means based on the identification information.

3. The information processor according to claim 2, wherein said program storing means attaches the identification information of the inputted destination information to the destination information and the instruction information read out from said data flow program and outputs the destination information, instruction information and identification information;

said operation processing means attaches said identification information of the inputted data, to the operand data indicating an operation result and outputs the operand data and the identification information.

4. The information processor according to claim 3, wherein said data flow program further includes copy information for specifying a copy process;

said program storing means, when destination information and instruction information is read out from said data flow program together with said copy information based on destination information inputted together with said identification information, attaches said identification information to the destination information and instruction information prior to outputting and reads subsequent destination information and instruction information from said data flow program and attaches the subsequent destination and instruction information with the same identification information prior to outputting.

5. The information processor according to claim 1, wherein said data pair detecting means detects two data having a same destination information and outputs the data together with destination information thereof.

6. An information processor for processing data packets in accordance with data flow program including a plurality of pairs of destination information and instruction information, comprising:

program storing means for storing the data flow program, for receiving a first data packet including identification information and destination information, for reading subsequent destination information and instruction information from the data flow program based on the destination information in said first data packet, and for outputting a second data packet including the read out destination information and instruction information and the identification information stored in said first data packet;

operation processing means for receiving a third data packet including identification information, instruction information and one or two data fields, for performing an operation process with respect to the data in said third data packet based on the instruction information in said third data packet, and for outputting a fourth data packet including data indicating a result of an operation process and the identification information stored in said third data packet;

merging means for receiving said second data packet from said program storing means and said fourth data packet from said operation processing means, for merging second and fourth data packets having a same identification information and for outputting a fifth data packet including the destination information and instruction information stored in said second data packet and the data stored in said fourth data packet;

data pair detecting means for receiving an output from said merging means for detecting two fifth data packets having a same destination information and for outputting a sixth data packet including destination information, instruction information and data stored in one of the fifth data packet and data stored in the other fifth data packet; and branching means for receiving said sixth data packet from said data pair detecting means, and outputting identification information and only the destination information stored in said sixth data packet to said program storing means as the first data packet, and outputting the same identification information and only the instruction information and the data stored in said sixth data packet to said operation processing means as the third data packet, for simultaneously executing process in said program storing means and said operation processing means.

7. An operating method for a data flow type information processor having a program storing device for storing the data flow program and for reading destination information and instruction information from the data flow program based on inputted destination information, an operation processing device for performing an operation process with respect to inputted data based on inputted instruction information and for outputting data indicating a result of the operation, and a data pair detecting device for outputting data having a same destination information together with the destination information and instruction information, the method comprising the steps of:

(a) attaching identification information, the identification information indicating correspondence between the destination information being supplied to the program storing device and the instruction information being supplied to the operation processing device, to the destination information and the instruction information or the data;

(b) merging the destination information and the instruction information read out from the program storing device with corresponding data outputted from the operation processing device based on the identification information;

(c) receiving an output from the data pair detecting device and outputting the identification information and only the destination information to the program storing device, and outputting the identification information and only the instruction information and the data to the operation processing device; and (d) simultaneously executing processes in said program storing device and said operation processing device.

* * * * *